(12) United States Patent
Noji et al.

(10) Patent No.: US 6,543,900 B2
(45) Date of Patent: Apr. 8, 2003

(54) PROJECTION APPARATUS

(75) Inventors: Minoru Noji, Kanagawa (JP); Hiroto Yasumura, Kanagawa (JP); Shigehiro Kadota, Tokyo (JP); Kazuyuki Shigeta, Kanagawa (JP); Toshinori Hirobe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/864,310

(22) Filed: May 25, 2001

(65) Prior Publication Data

US 2002/0008850 A1 Jan. 24, 2002

(30) Foreign Application Priority Data

May 29, 2000 (JP) ........................ 2000-158656
May 21, 2001 (JP) ........................ 2001-150252

(51) Int. Cl.[7] .............................................. G03B 21/28
(52) U.S. Cl. ............................................ 353/94; 353/98
(58) Field of Search .......................... 353/94, 37, 98, 353/87, 85; 349/5, 7, 8, 61, 68; 362/210, 227

(56) References Cited

U.S. PATENT DOCUMENTS

| 5,296,883 | A | * | 3/1994 | Park et al. ............... 353/87 |
| 5,669,686 | A | * | 9/1997 | Moon ...................... 353/98 |
| 5,772,301 | A | * | 6/1998 | Kwon et al. ............. 353/94 |
| 6,222,674 | B1 | * | 4/2001 | Ohta ....................... 353/94 |
| 6,409,350 | B1 | * | 6/2002 | Kakimoto et al. ....... 353/85 |

* cited by examiner

Primary Examiner—William Dowling
(74) Attorney, Agent, or Firm—Fitzpatrick, Cella, Harper & Scinto (57) ABSTRACT

The present invention provides a projection apparatus utilizing plural light sources, in which the light source principally irradiating the light valve is switched by moving the relative position between the plural light sources and the mirror for guiding the lights outputted from such light source to the light valve. Also the configuration can be simplified by using commonly the light condensing device for the plural light sources.

18 Claims, 10 Drawing Sheets

PROJECTION APPARATUS

BACKGROUND OF THE INVENTION

1. Field of the Invention

The present invention relates to a light valve projection apparatus for magnified projection of an image of a liquid crystal panel or a micromirror rocking pixel panel, and more particularly to a projection apparatus equipped, as the light source, with a light source of instantly light emitting type and that of high efficiency and high color presenting ability. The present invention is applicable to a projector of front projection type for direct projection onto a reflective screen, a projection of rear projection type for projection on a transmissive screen, or an apparatus in which either of the foregoing is combined with another equipment, utilizing a transmissive or reflective liquid crystal device or a micro mirror rocking pixel device.

2. Related Background Art

There are already commercialized apparatus for magnified projection of the image of a light valve panel such as a liquid crystal device, utilizing a light source such as a metal halide lamp.

In such apparatus the light emitted from the light source is concentrated on a light valve panel for example through a mirror, and is projected through a projection lens onto a screen.

The apparatus is known in various types such as a single panel type utilizing a liquid crystal panel, and a three-panel type in which three liquid crystal panels are illuminated by color separation through dichroic mirrors and the transmitted lights are color synthesized, and the liquid crystal panel of transmissive type is adopted for this purpose but that of reflective type is also utilized recently.

Also instead of the liquid crystal panel, there has been developed a panel in which micromirrors are arrayed on a semiconductor chip as pixels and the micromirror of each pixel is driven in a rocking motion to control the gradation, and such panel is also utilized in a single panel type utilizing color-sequential light sources and a three-panel type in which three panels are illuminated by color separation through dichroic mirrors and the reflected lights are color synthesized.

The illumination for such projector is required to be of a high illumination intensity in order that the projected image can be viewed on a large screen even in a well lighted room, and, for this reason, the light source is principally composed of a metal halide lamp or a high pressure mercury lamp of high efficiency and high color presenting ability.

Figure 11:
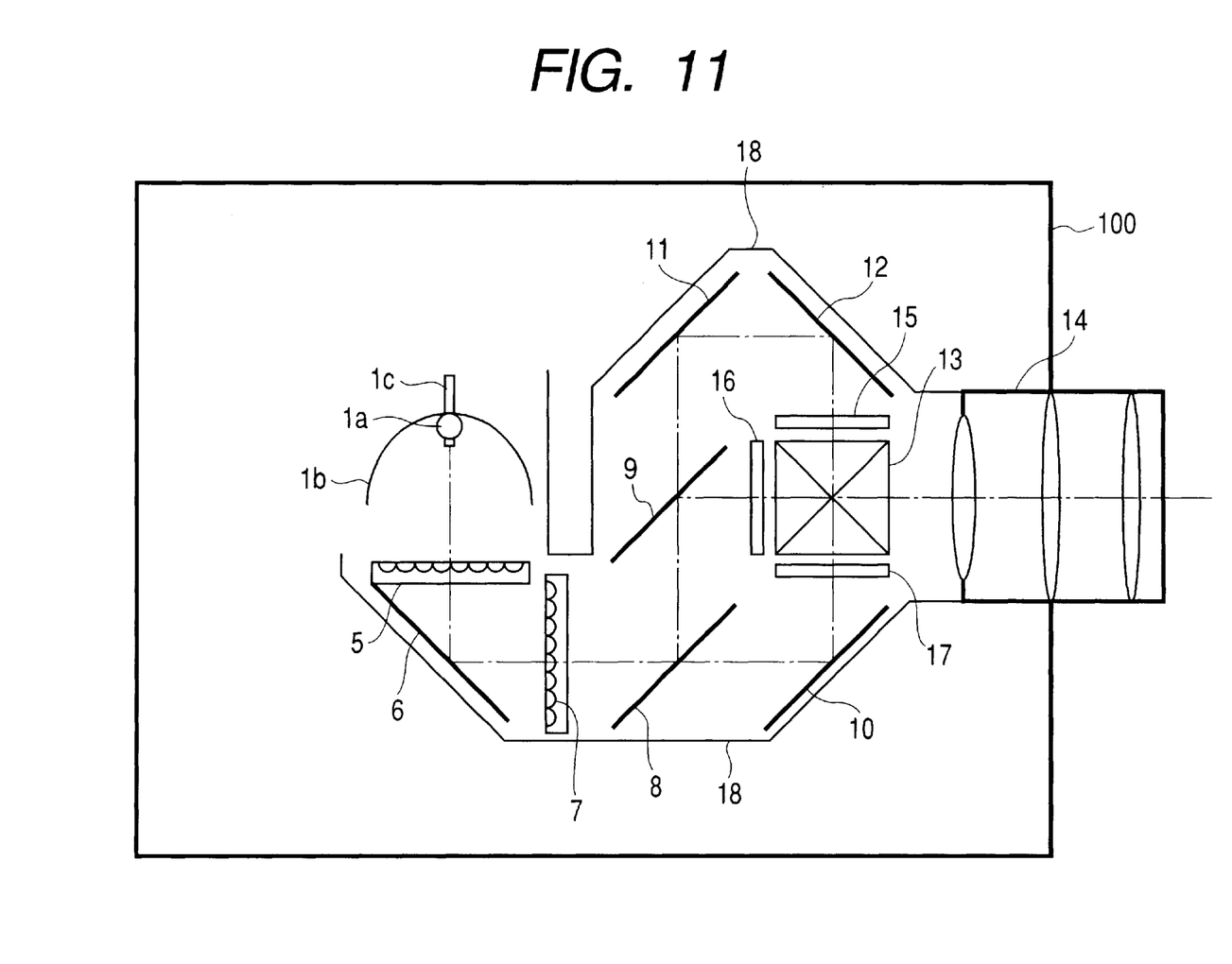
FIG. 11 is a view showing the configuration of a conventional projection apparatus.

FIG. 11 shows an example of the configuration of a conventional liquid crystal projector of three panel type.

In FIG. 11, there are shown a metal halide lamp 1a which is a discharge tube, a reflector 1b formed in an elliptic or parabolic surface, an electrode 1c of the metal halide lamp 1a, a first fly's eye lens 7, dichroic mirrors 8, 9, mirrors 10, 11, 12, a cross dichroic prism 13, a projection lens 14, a red-color transmissive liquid crystal panel 15, a green-color transmissive liquid crystal panel 16, a blue-color transmissive liquid crystal panel 17, an optical system shielding case 18, and an external casing 100 containing the entire projection system.

When a power switch of the apparatus shown in FIG. 11 is turned on, the metal halide lamp 1a is energized and starts lighting.

Then the light emitted from the metal halide lamp 1a is converted into a relatively parallel illuminating light by the reflector 1b and enters the fly's eye lens 5.

The fly's eye lens 5 has a composite structure of plural lenses and has an effect, in combination with a fly's eye lens 7, of flattening the luminance on an irradiated surface at the rear.

A mirror 6 bends the optical path of the illuminating light from the fly's eye lens 5 by 90° for entry into the fly's eye lens 7.

The mirror 6 is provided with a dichroic film for transmitting infrared and ultraviolet light, thereby reducing the infrared and ultraviolet components in the visible light entering the fly' eye lens 7 and thus reducing heat generation and improving reliability.

The visible light emerging from the fly's eye lens 7 enters a dichroic mirror 8 through which blue light is transmitted, then bent in the optical path by a mirror 10 and enters a transmissive liquid crystal panel 17 for blue color.

On the other hand, in the dichroic mirror 8, the light of green and red colors, having a wavelength longer than that of blue color, is reflected and enters a dichroic mirror 9.

The dichroic mirror 9 has a property of reflecting green light and illuminates a transmissive liquid crystal panel 16 for green color.

In the dichroic mirror 9, the light red color, having a wavelength longer than that of the green color, is reflected, then bent in the optical path by mirrors 11, 12 and illuminates a transmissive liquid crystal panel 15 for red color.

The aforementioned liquid crystal panels 15, 16, 17 respectively for red, green and blue colors receive unrepresented drive signals for the respective colors to display an image in the display area of each panel, thereby optically modulating the illuminating light mentioned above.

The image displayed on the green liquid crystal panel 16 is being vertically inverted (FIG. 11 being a plan view) electrically or by reversing the front and back surfaces of the panel with respect to the images displayed on the liquid crystal panels 15, 17 for other colors, in consideration of the process of image synthesis in a dichroic mirror 13.

The image lights from the transmissive liquid crystal panels 15, 16, 17 for the red, green and blue colors enter a cross dichroic prism 13 respectively from predetermined directions as illustrated, thus being synthesized and emerging as a color image from an illustrated fourth face and enters a projection lens 14 for magnified projection onto a screen.

Also a configuration employing two light sources is disclosed in the Japanese Utility Model Application Laid-open No. 4-33034 and the Japanese Patent Application Laid-open No. 9-127467.

SUMMARY OF THE INVENTION

An object of the present invention is to provide a preferred configuration employing plural light sources in a projection apparatus.

If the light source of a projection apparatus of liquid crystal panel type or micromirror rocking pixel panel type is composed of a discharge lamp of high efficiency and high color presenting ability such as a metal halide lamp or a high pressure mercury lamp, there is required a time of at least 2 to 3 minutes until such illuminating lamp reaches a predetermined light amount after the power supply is turned on.

Also in case of recovery from an instantaneous interruption of the power supply for certain reason, there is required an even longer time (3 to 5 minutes) before the lamp can be turned on again. Thus, there is encountered a serious drawback that the image cannot be projected during such period, particularly in applications requiring urgency, such as important presentations or conferences.

In such situation, the presence of plural light sources may be advantageous for illuminating the light valve. The present invention is to provide, in case of employing plural light sources, a configuration capable of efficiently illuminating the light valve or a configuration enabling simplification even in case of using plural light sources.

According to one of the inventions of the present application, there is provided a projection apparatus provided with a light valve which modulates light by two-dimensionally arranged plural pixels and projects thus modulated light, the apparatus comprising:

a first light source;

a second light source;

a mirror for guiding the light from the first light source or the light from the second light source; and a movable mechanism for varying the relative position between the mirror and the first and second light sources.

In such configuration, owing to the presence of the movable mechanism for changing the relative position between the mirror and the light sources, there can be switched a state in which the first light source principally irradiates the light valve and a state in which the second light source principally irradiates the light valve by varying the relative position between the mirror and the light sources.

In this manner there can be dispensed with a half mirror to be provided on the optical paths of the output lights from the separately provided light sources for using such optical paths partly in common.

For varying the relative position between the mirror and the light sources, there can be advantageously employed a configuration for moving the position of the mirror or a configuration for moving the position of the light sources.

According to another of the inventions of the present application, there is provided a projection apparatus provided with a light valve which modulates light by two-dimensionally arranged plural pixels and projects thus modulated light, the apparatus comprising:

a first light source;

a second light source; and a reflector for condensing the light from the first light source and the light from the second light source;

wherein the first and second light sources are positioned in the vicinity of the focal point of the reflector.

This invention allows to extremely simplify the structure of the light source portion, and there can be advantageously employed a configuration in which the first light source and the second light source have different light emitting characteristics (particularly change in the light amount with the lapse of time after the power supply is turned on).

Also in this invention, there can be employed a configuration in which the first light source includes light regulating means for regulating the light amount irradiating the light valve. For such light regulating means, there can be advantageously employed a control circuit for regulating the amount of the output light of the first light source.

There is also advantageously employed a configuration in which the light amount of the first light source irradiating the light valve is gradually decreased within a period after the power supply to the second light source is turned on and until the second light source reaches the stably turned-on state.

There can be reduced the unpleasant feeling on the observed image by such control that the sum of the light amount irradiating the light valve by the first light source and that irradiating the light valve by the second light source approaches a constant value. For such control, there can be employed a control circuit for regulating the amount of the output light of the first light source.

For realizing such light regulation, there can be adopted a configuration for regulating the light according to correction data, based on the change of the light amount of the second light source as a function of the lapse of time from the start of light emission. The light regulation in such case can be realized with the lapse of time. A timer may be used for realizing the light regulation according to the lapse of time. Also there may be employed a configuration of executing the aforementioned light regulation based on the result of detecting the amount of light irradiating the light valve.

The aforementioned inventions can be advantageously adopted in case the two light sources have different characteristics, but can more advantageously be employed particularly in case the first light source has a period from the turning-on of the power supply to the stable lighting state shorter than that of the second light source. The period from the turning-on of the power supply to the stable lighting state means a period from the timing of turning-on of the power supply to the timing where the light amount reaches 90% of the light amount at a timing after the lapse of sufficient time from the turning-on of the power supply (namely a stationary light emitting state). It is particularly preferable if the period from the turning-on of the power supply to the stable lighting state in the first light source is shorter by at least 15 seconds than that in the second light source.

Also in the aforementioned inventions, there can be advantageously adopted a configuration having a timer for controlling the irradiation of the light valve by the light from the first light source, or a configuration having a light amount sensor for controlling the irradiation of the light valve by the light from the first light source. For example, the light amount irradiating the light valve by the light from the first light source can be controlled according to the output value of the sensor for detecting the output light amount of the second light source.

Also in the aforementioned inventions, there is preferably provided stopping means for stopping the light emission of the second light source for a predetermined period. In this manner, after an interruption of the power supply, the light emission of the second light source can be stopped for the predetermined period. In such case the light valve can be irradiated by the light from the first light source.

The aforementioned first light source can be composed of a xenon-based lamp, a halogen light bulb, a tungsten light bulb, a fluorescent lamp, a light emitting diode or an electron source-based light source, and the second light source can be advantageously composed of a metal halide lamp or a mercury-sealed discharge lamp.

Also in the aforementioned inventions, there is preferably adopted a configuration utilizing, as a filter for filtering the light irradiating the light valve, an optical filter to be employed either of a period in which the light valve is principally irradiated by the first light source and a period in which the light valve is principally irradiated by the second light source.

Also in the aforementioned inventions, there is preferably adopted a configuration having a circuit which executes different operations on the image signal for driving the light valve, respectively in a period in which the light valve is principally irradiated by the first light source and in a period in which the light valve is principally irradiated by the second light source. The aforementioned operation on the image signal can be, for example, an operation of adjusting the contrast, brightness or gamma characteristics of the image.

DETAILED DESCRIPTION OF THE PREFERRED EMBODIMENTS

First Embodiment

Figure 1:
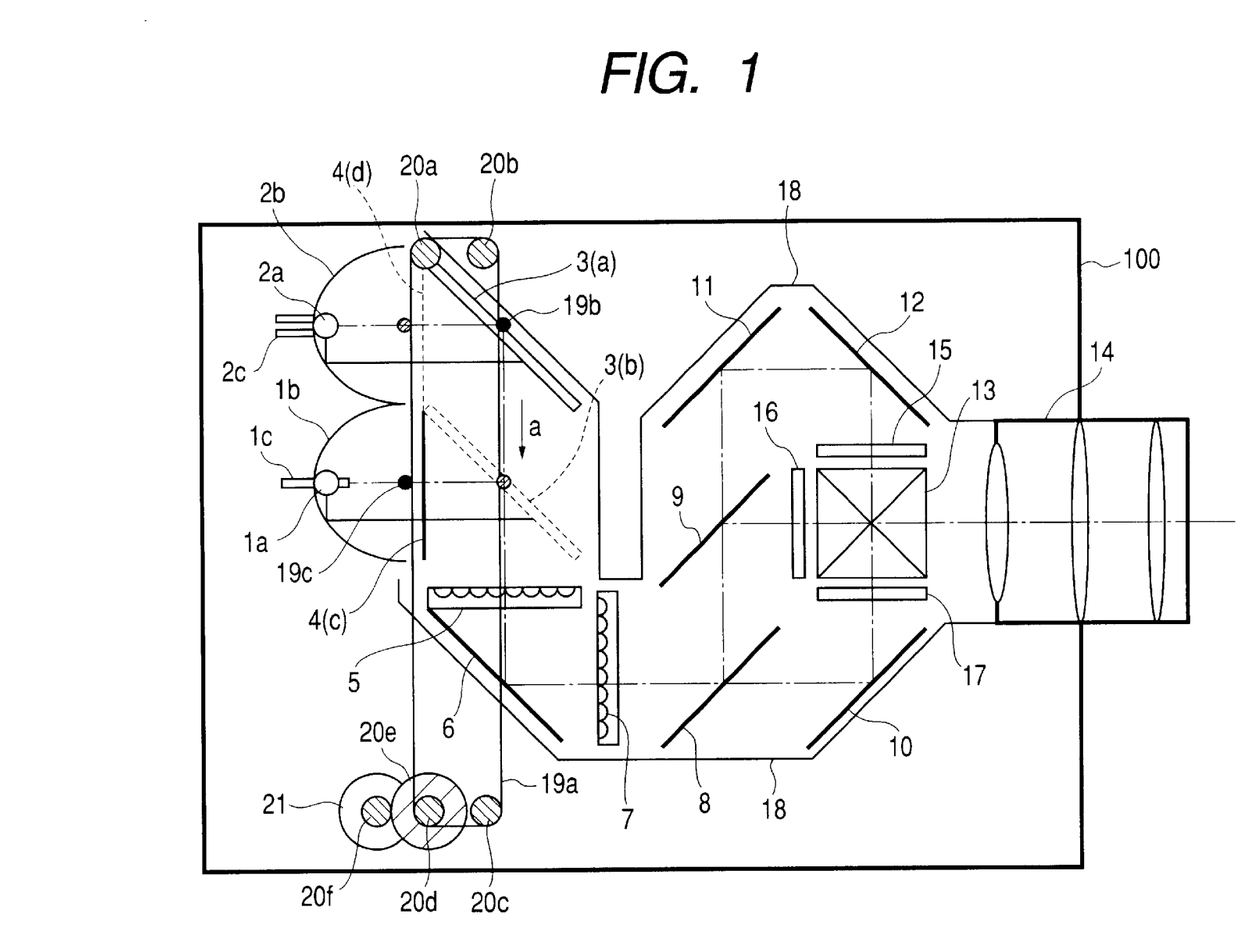
FIG. 1 is a plan view showing the optical layout of a projector in a liquid crystal projection apparatus constituting a first embodiment of the present invention.

In the following there will be described a projection apparatus provided with a light source and a projector for illuminating a light valve having a two-dimensional array of plural pixels with the light from the light source thereby projecting the image of the light valve onto a screen, the apparatus comprising a first light source capable of instantaneous lighting, a second light source of high efficiency and high color presenting characteristics, and further comprising light source switching means and lighting order control means for the light sources for instantaneously projecting the image by the light source of faster lighting speed at the turning-on of power supply of the apparatus and, when the light source of high efficiency and stable lighting which is limited in the lighting speed is stably lighted, switching the optical path to the latter light source and at the same time turning off the aforementioned light source of faster light speed thereby projecting the image with high efficiency and high color presentation utilizing the latter light source for illumination. FIG. 1, best representing the feature of the present embodiment, is a plan view showing the internal structure of a projector system in the projection apparatus of the present embodiment, wherein shown are a metal halide lamp 1a which is a discharge lamp constituting illumination means of a relatively long time (t=B) from the turning-on of the power supply to the stable lighting state, a reflection mirror 1b of an elliptical or parabolic shape, an electrode 1c of the metal halide lamp 1a, a halogen lamp constituting illumination means of a relatively short time (t=A) from the turning-on of the power supply to the stable lighting state, a reflection mirror 2b of an elliptical or parabolic shape, an electrode 1c of the halogen lamp 2a, a movable mirror 3(a and b), a shutter 4(c and d), a first fly's eye lens 5, a mirror 6, a second fly's eye lens 7, dichroic mirrors 8, 9, mirrors 10, 11, 12, a cross dichroic prism 13, a projection lens 14, a transmissive liquid crystal panel 15 for red color, a transmissive liquid crystal panel 16 for green color, and a transmissive liquid crystal panel 17 for blue color.

There are also shown an optical system shielding case 18, a timing belt 19a, a connection member 19b for connecting the timing belt 19a and the movable mirror 3, a fixing member 19c for connecting the timing belt 19a and the shutter 4, timing belt driving pulleys 20a, 20b, 20c, a timing belt driving pulley 20d linked with a gear, a gear 20e engaging with the pulley 20d and having a diameter larger than that of the pulley 20d, a link gear 20f meshing with the gear 20e, a driving motor 21 coaxially connected with the gear 20f, and an outer casing 100 containing the entire projection system.

Figure 4:
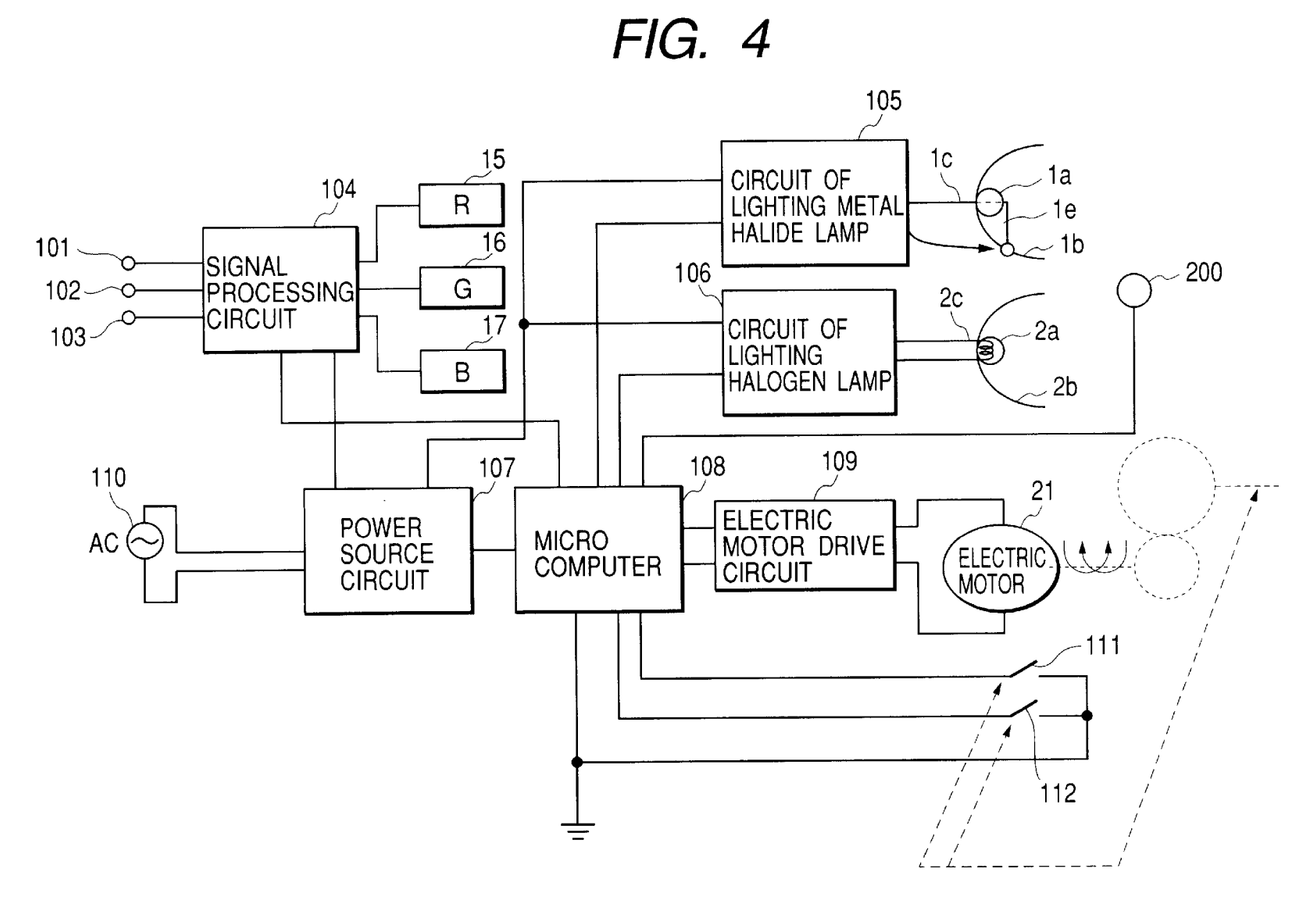
FIG. 4 is a block diagram of a circuit embodying the present invention.

FIG. 4 is a view showing the electrical configuration of the present embodiment, wherein shown are a red color signal input terminal 101, a green color signal input terminal 102, a blue color signal input terminal 103, a signal processing circuit block 104, a metal halide lamp lighting circuit 105, a halogen lamp lighting circuit 106, a power source circuit 107 for the entire system, a microcomputer 108 constituting control means for controlling the present system, an electric motor drive circuit 109, a motor 21 for driving the timing belt 19a, switches 111, 112 constituting position sensors for detecting the position of the timing belt 19a, the shutter 4 or the mirror 3, and a power supply terminal 110 of the projection apparatus of the present embodiment.

Figure 5:
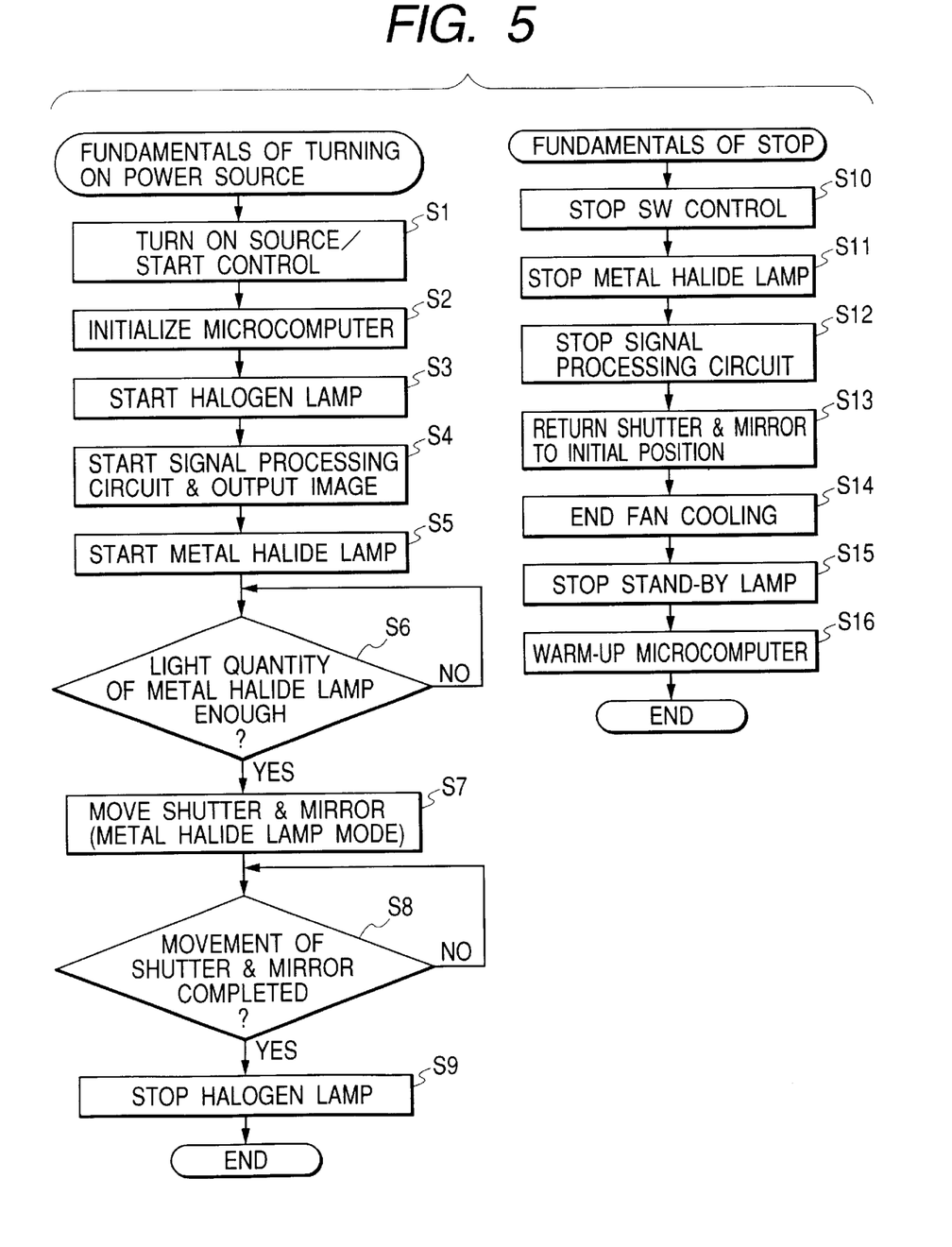
FIG. 5 is a flow chart showing the lamp lighting control in a first embodiment of the present invention.
Figure 6:
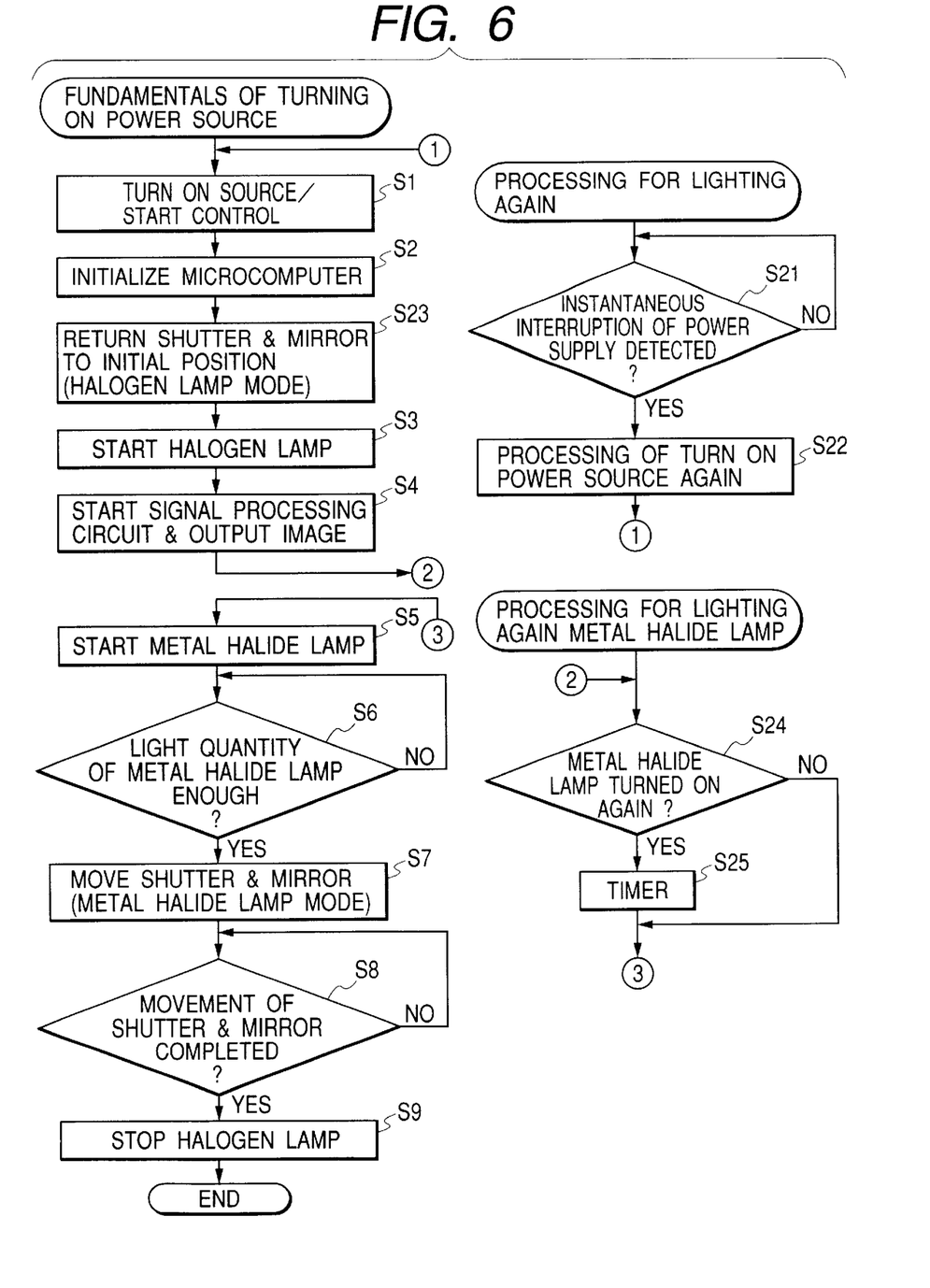
FIG. 6 is a flow chart showing the lamp re-lighting control in a first embodiment of the present invention.

FIG. 5 is a flow chart showing the internal control sequence at the start or termination of the function of the projector, and FIG. 6 is a flow chart showing the internal control sequence in an instantaneous interruption process of the projector.

Figure 2:
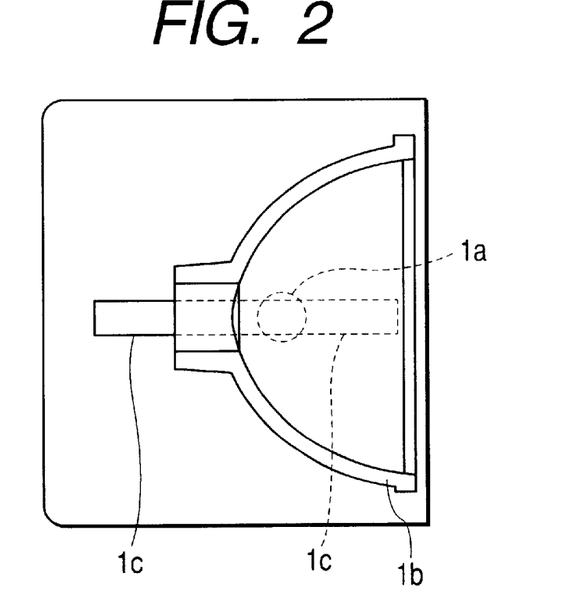
FIG. 2 is a view showing the structure of a metal halide lamp embodying the present invention.

FIG. 2 shows the structure of the metal halide lamp unit in the projection system of the present embodiment shown in FIG. 1. The metal halide lamp 1a is fixed approximately at the focal point of a reflector 1b of an elliptical or parabolic surface, and the electrode 1c of the metal halide lamp 1a is guided through a small hole provided on the optical axis of the reflector 1b opposite to the projecting direction thereof.

Another electrode, though not shown, consists of a metal wire 1e penetrating through the reflector 1b in a position on the external periphery thereof and relatively distant from the electrode 1c of the metal halide lamp 1a, and is connected by an insulated wire to the metal halide lamp lighting circuit 105 shown in FIG. 4.

Figure 3:
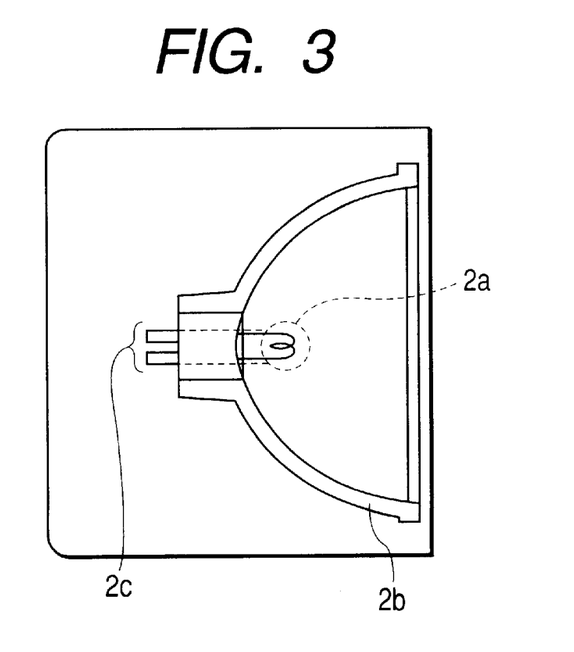
FIG. 3 is a view showing the structure of a halogen lamp unit embodying the present invention.

Also FIG. 3 shows the structure of the halogen lamp unit of the present embodiment. The halogen lamp 2a is fixed approximately at the focal point of a reflector 1b of an elliptical or parabolic surface, and the electrode 2c is extracted to the rear through a relatively small hole provided on the rear part of the optical axis of the reflector 2b having an elliptical or parabolic surface, and is connected by an insulated wire to the halogen lamp lighting circuit 106 shown in FIG. 4.

In the following there will be explained, with reference to a flow chart shown in FIG. 5, the function of the projection apparatus of the present embodiment from a state immediately after an operation switch for shifting to a projection state is turned on (such state being hereinafter called initial state) from a state in which the power supply of the projection apparatus is not turned on or from a stand-by state in which the master power supply is turned on.

The temperature rise resulting from the heat generation for example by the light sources in the main body is maintained within a safe range by a cooling fan or the like provided in the main body though such colling means will not be explained in detail.

Referring to the flow chart shown in FIG. 5, immediately after the power supply is turned on or the operation switch for shifting to the projection mode is turned on from a stand-by state in which the master power supply is already turned on in a step S1, there is executed initial setting for the microcomputer (step S2) to turn on the halogen lamp 2a (step S3). The metal halide lamp 1a is also similarly turned on (step S5).

The halogen lamp 2a and the metal halide lamp 1a have the following start-up characteristics of the illumination intensity immediately after the start of lighting. The halogen lamp 2a has a sufficient intensity from immediately after the start of lighting (in general reaching 90% of the final intensity in about 300 msec), and maintains stable light emission thereafter. Consequently a step S4 executes activation of the signal processing circuit and output of image, utilizing the halogen lamp 2a as the light source.

On the other hand, in the metal halide lamp 1a, though the light amount gradually increases, the mercury vapor pressure in the lamp starts to rise at about 20 seconds from the start of lighting, whereupon the lamp voltage starts to increase rapidly and approximately reaches the rated voltage after 2 to 3 minutes. The time required for stabilization of the lamp fluctuates depending on the state of external forced air cooling in the course of start-up of the lamp, presence or absence of the reflector and the glass plate in front of the lamp.

Until the lamp becomes stabilized, the lighting circuit 105 executes current control by monitoring the lamp voltage. Consequently the start-up state of the light amount is approximately linked with the behavior of the lamp voltage. Stated differently, there is at least required 2 to 3 minutes until the light amount becomes stabilized.

Also cooling is executed with a cooling fan or the like, though such cooling means is not illustrated, in order to avoid temperature rise of the apparatus resulting from the heat generated by the aforementioned light sources etc.

In the aforementioned initial state, the mirror 3 is provided in a position 3(a) that reflects the light from the halogen lamp 2a onto the fly's eye lens 5.

Also the shutter 4 is provided in a position 4(c) that intercepts the light beam from the metal halide lamp 1a.

The mirror 3 is mechanically linked, at an upper portion (outside the optical path) thereof, to the timing belt 19a by the coupling member 19b, and the shutter 4 is mechanically linked, at an upper portion (outside the optical path) thereof, to a position 4(c) of the timing belt 19a by the coupling member 19c.

The running path of the timing belt 19a is determined as shown in FIG. 1 by the four pulleys 20a, 20b, 20c, 20d.

The pulley 20d is coaxially linked with the gear 20e which is larger than the pulley 20d, and the gear 20e engages, at a point on the external periphery thereof, with a gear 20f whereby the pulley 20d is rotated at a reduced speed by the motor 21 and the timing belt 19a is conveyed with a sufficient torque.

The stopping positions of the mirror 3 and the shutter 4 are determined by unrepresented detection means. Such detection can be achieved by forming projections on a part of the mirror 3 and the shutter 4 or forming a projection or an optical marking on the timing belt 19a and detecting such projections or optical marking optically by photointerruptors or mechanically by microswitches, or forming electric conductors as projections on a part of the mirror 3 and the shutter 4 or on a part of the timing belt 19a and detecting such conductors by electric conduction by contactor members. Also magnetic detection is possible. In the present embodiment, the positions of the mirror 3 and the shutter 4 are controlled, as shown in FIG. 4, by detection with detection switching 111, 112 connected to two input ports of the microcomputer 108, which, through a programmed process, drives the motor 21 by the motor drive circuit 109, thereby controlling the rotation and the moving direction of the timing belt 19a.

Consequently, in the aforementioned initial state, the light from the halogen lamp 2a enters, through the mirror 3a, the first fly's eye lens 5. The light transmitted by the fly's eye lens 5 enters, through the mirror 6, the second fly's eye lens 7, and the light entering the second fly's eye lens 7 irradiates the dichroic mirror 8.

The dichroic mirror 8 is set at such angle that the transmitted light has a blue wavelength, and the light of blue color is deflected in the direction by the mirror 10 and irradiates the liquid crystal panel 17.

On the other hand, the green and red lights are reflected by the dichroic mirror 8 and, with the deflection of the optical path by 90°, enters the dichroic mirror 9.

The dichroic mirror 9 reflects the green light, which then illuminates the liquid crystal panel 16.

Also the dichroic mirror 9 transmits the red light, which, after deflections of the direction of the optical path by the mirrors 11, 12, illuminates the liquid crystal panel 15.

The liquid crystal panel 15 displays an image of the red component by a red color signal processing circuit, while the liquid crystal panel 16 displays an image of the green component by a green color signal processing circuit, and the liquid crystal panel 17 displays an image of the blue component by a blue color signal processing circuit. Such electrical configuration is shown in the block diagram in FIG. 4.

Referring to FIG. 1, the liquid crystal panels 15, 16, 17 are principally composed of transmissive active matrix liquid crystal panels based on polysilicon TFT's and having a size of 0.9 to 1.8 inches.

The blue, green and red images emerging from the liquid crystal panels 15, 16, 17 enter the cross dichroic prism 13 from respective sides and are synthesized therein, whereby a color image is projected by the projection lens 14 in magnified manner onto the screen. The directions of the images displayed on the liquid crystal panels 15, 16, 17 are same as those in the conventional configuration explained in the foregoing.

Then, when the light amount of the metal halide lamp 1a, after the start of lighting thereof in the step S5 of FIG. 5, gradually increases and approximately reaches the lighting state of stable light amount after the start-up time of about 2 to 3 minutes, a step S6 discriminates whether the light amount from the metal halide lamp 1a is sufficient. If sufficient, a step S7 moves the mirror 3 and the shutter 4 to positions of a metal halide lamp mode. More specifically, the motor 21 is activated to convey the timing belt 19a in a direction a by the pulleys 20f, 20e, 20d constituting the mechanical transmission system, whereby the mirror 3 reaches a position 3(b).

On the other hand, the shutter 4 linked also to the timing belt 19a is moved in the same rotating direction to a position 4(*d*). The timing belt 19*a*, or the shutter 4, mirror 3 and rotating mechanism 20 (20*a* to 20*f*) are linked with the unrepresented position detecting sensors as explained in the foregoing, and the result of detection is fed back to the microcomputer 108 (FIG. 4) which, through a programmed process, drives the motor 21 by the motor drive circuit 109 to control the rotation and the rotating direction of the timing belt 19*a* thereby controlling the positions of the mirror 3 and the shutter 4 and stopping them at the predetermined positions. Then a step S8 discriminates whether the movement of the shutter 4 and the mirror 3 has been completed.

In this manner the light emitted from the metal halide lamp 1*a*, which is a discharge lamp, enters the fly's eye lens 5 through the mirror 3.

The optical path after the fly's eye lens 5 is same as explained in the foregoing, and the light is projected by the projection lens 14 onto the screen.

At the same time, the light from the halogen lamp 2 is intercepted by the shutter 4 and the halogen lamp is turned off by the light source control circuit 106 after an arbitrary safety time (step 9), and the projection thereafter is executed by the metal halide lamp 1*a* as the light source to achieve stable image projection with high efficiency and high color presentation.

Referring to FIG. 5, a process of terminating the function of the apparatus is executed by a stop switch control (step S10), stopping of the metal halide lamp 1*a* (step S11), stopping of the signal processing circuit 104 (step S12), returning of the shutter 4 and the mirror 3 to the initial positions (step S13), stopping of fan cooling (step S14), stopping of stand-by lamp 8 step S15), and warming-up of the microcomputer 108 (step S16).

In case an instantaneous interruption of the power supply occurs in the stable projection state with high efficiency and high color presentation after the switching of the light source from the halogen lamp 2*a* to the metal halide lamp 1*a*, a step S21 in a flow chart shown in FIG. 6 detects the instantaneous interruption of power supply, then a step S22 executes a process of turning on the power supply again, and, when the power supply is restored, the unrepresented cooling fan is activated to maintain the interior at a predetermined temperature. Then, after the power turning-on/start control of the step S1 and the microcomputer initial setting in the step S2 as shown in FIG. 5, a step S23 causes the motor 21 to convey the timing belt 19*a* through the gear 20*f*, the large gear 20*e* and the pulley 20*d* of the power transmission system thereby returning the shutter 4 and the mirror 3 respectively to the aforementioned positions 4(*c*) and 3(*a*).

Also the halogen lamp 2*a* is immediately turned on (step S3). The light from the halogen lamp 2*a* irradiates the fly's eye lens 5 to project the image onto the screen (step S4).

The metal halide lamp 1*a* is subjected to a metal halide lamp re-lighting process. When a step S24 identifies the re-lighting of the metal halide lamp, a step S25 suspends the re-lighting of the metal halide lamp 1*a* during a re-lighting prohibition time determined by a timer. The re-lighting prohibition time in the step S25 is for restoring the reliability of the metal halide lamp, and is in general 2 to several minutes.

Through the above-described process, the projection apparatus of the present embodiment, when the power supply is restored after instantaneous interruption thereof is immediately capable of image projection without being restricted by the aforementioned re-lighting prohibition time of the metal halide lamp 1*a*.

After the lapse of the re-lighting prohibition time of the metal halide lamp 1*a*, the metal halide lamp 1*a* is turned on again (step S5), and there is discriminated whether the light amount of the metal halide lamp 1*a* has reached a predetermined value (step S6). When the predetermined light amount is reached, as in the aforementioned sequence in the initial lighting process, a step S7 causes the motor 21 to convey the timing belt 19*a* through the gear 20*f*, the large gear 20*e* and the pulley 20*d* of the power transmission system thereby moving the shutter 4 to the position 4(*c*) and the mirror 6 to the position 4(*d*). Then, when a step S8 confirms the completion of the movement, a step S9 utilizes the light from the metal halide lamp 1*a* for illumination through the fly's eye lens 5, thereby restoring the image projection with high efficiency and high color presentation.

In the foregoing embodiment, the lamp having a longer time from the start of lighting to the stable lighting state can be composed of a discharge lamp which is not limited to the metal halide lamp 1*a* explained in the foregoing but can also be a lamp containing mercury-based gas such as a high pressure mercury lamp.

Also the light source capable of providing a stable light amount immediately after the start of lighting is not limited to the halogen lamp 2*a*, but can also be composed of an incandescent lamp such as tungsten bulb, a xenon discharge lamp containing xenon gas, a fluorescent lamp, a light emitting diode, a fluorescent display tube or an electron source-type light source.

It is also possible to dispense with the shutter 4 and to guide the light, transmitted by the mirror 3 without reflection thereon, directly to the optical system shielding case 18 or the like. In such case, the optical system shielding case 18 is preferably provided with surface treatment such as of black color, in order to reduce light reflection. Also heat dissipation is preferably considered for the optical system shielding case 18 in order to avoid temperature rise thereof resulting from the light irradiation.

Also instead of switching the two light sources by moving the mirror 3, similar effects can be obtained by fixing the mirror 3 and the subsequent optical path and moving the halogen lamp 2*a* and the metal halide lamp 1*a*.

As explained in the foregoing, the configuration of employing the halogen lamp 2*a* as the light source within the period required for the stabilization of the light amount of the discharge lamp such as the metal halide lamp 1*a* enables image projection immediately after the turning-on of the power supply to the main apparatus or after the start operation from the stand-by state. Also the image projection can be promptly restored after the instantaneous interruption of the power supply.

Second Embodiment

In the foregoing first embodiment, the light sources are switched by the mirror and the shutter. On the other hand, the projection apparatus constituting a second embodiment of the present invention has a configuration shown in FIGS. 4 and 8, in which the metal halide lamp 1*a* constituted by a discharge lamp and the halogen lamp 2*a* are positioned side by side and are fixed in an approximate focal point of a reflector 1*d* having a common elliptical or parabolic surface, and the respective electrodes 1*c*, 2*c* are extracted through the reflector id and are respectively connected to the lighting circuits 105, 106 shown in FIG. 4.

Figure 7A:
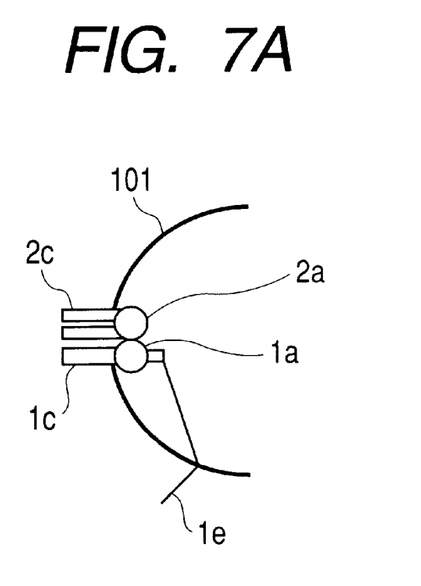
FIGS. 7A and 7B are respectively a lateral view and an elevation view of a composite lamp unit in the first embodiment of the present invention.
Figure 7B:
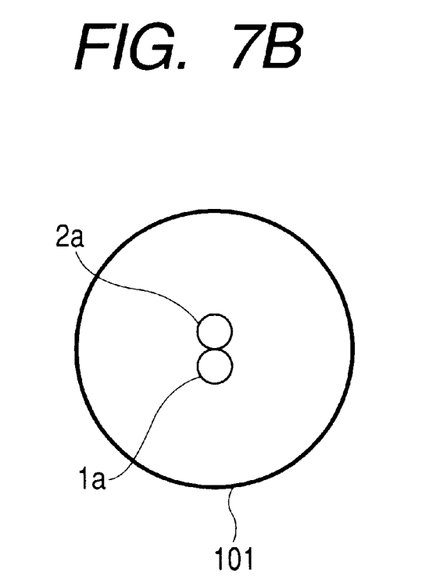

The metal halide lamp 1*a* and the halogen lamp 2*a* mounted on the common reflector 1*d* and the respective terminals will be hereinafter called a composite lamp unit 201, of which external view is shown in FIG. 7.

Figure 8:
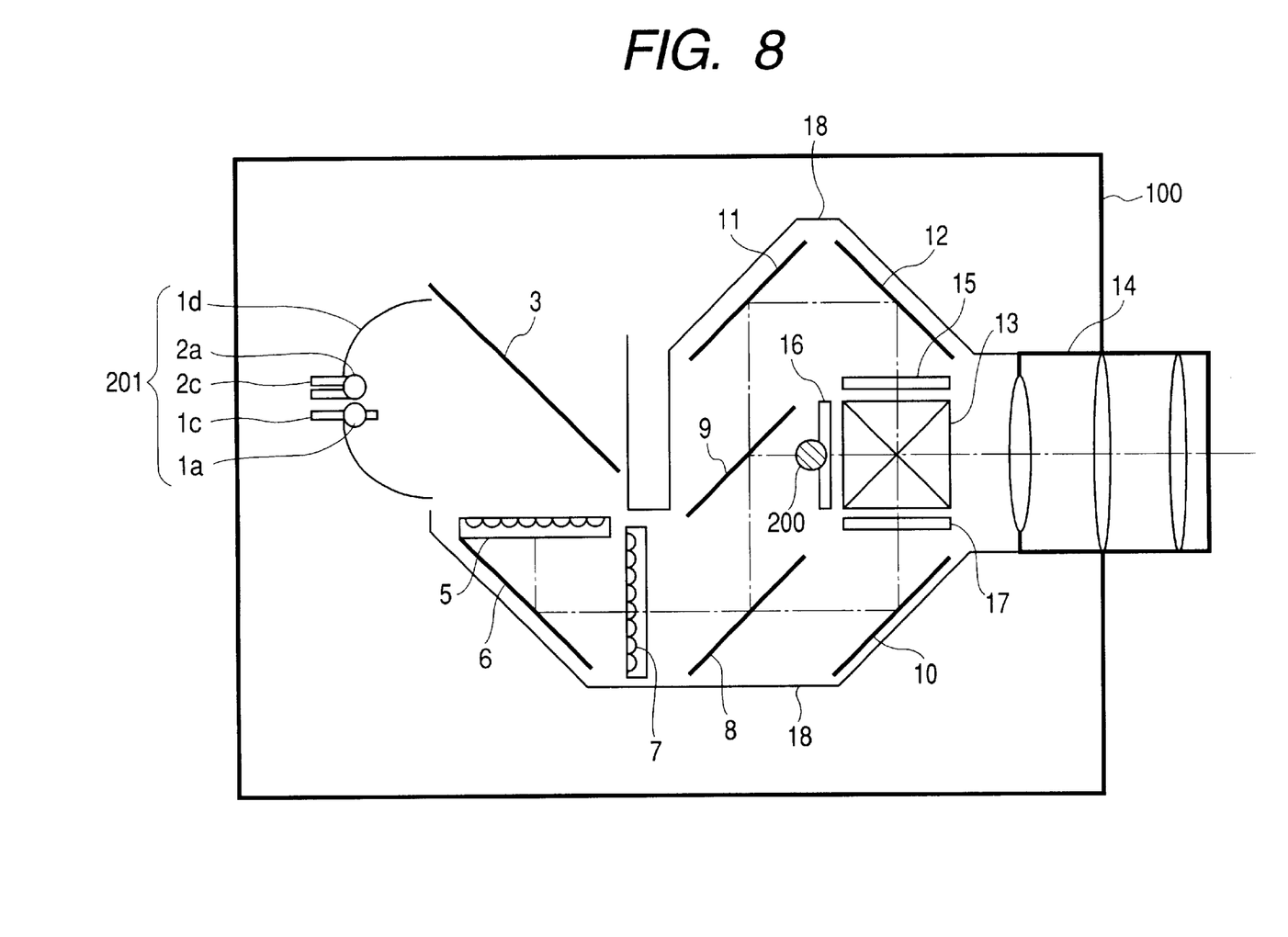
FIG. 8 is a plan view showing the optical layout of a projector in a liquid crystal projection apparatus constituting a second embodiment of the present invention.

In the following there will be explained the function of the projection apparatus of the second embodiment, of which principal structure is shown in FIG. 8. In FIG. 8, the light from the composite lamp unit 201 enters the fly's eye lens 5 through the mirror 3, and the optical path thereafter is same as in the foregoing first embodiment.

In the following there will be explained, with reference to a flow chart shown in FIG. 9, the function of the projection apparatus of the present embodiment after the turning-on of the power supply. At first, immediately after the power supply is turned on or the operation switch for shifting to the projection mode is turned on from a stand-by state in which the master power supply is already turned on in a step S1, there is executed initial setting for the microcomputer (step S2) to turn on the halogen lamp 2a (step S3). The metal halide lamp 1a is also similarly turned on.

The start-up characteristics of the illumination intensity of the two lamps immediately after the start of lighting is, as explained in the foregoing, such that the halogen lamp 2a has a sufficient intensity from immediately after the start of lighting (in general reaching 90% of the final intensity in about 300 msec), and maintains stable light emission thereafter. Consequently a step S4 executes activation of the signal processing circuit thereby achieving image output.

On the other hand, as explained in the foregoing, the metal halide lamp 1a gradually increases the light amount and reaches the final light amount level in about 2 to 3 minutes (step S5). If a step S6 identifies that the light amount of the metal halide lamp 1a is sufficient, a step S9 turns off the halogen lamp 2a.

The reflector 1d collectively condenses both lights for entry into the fly's eye lens 5 whereby the image projection is thereafter achieved in the same manner as in the first embodiment,and, corresponding to the gradual increase in the light amount of the metal halide lamp 1a, the halogen lamp lighting circuit 106 attenuates the light amount of the halogen lamp 2a in time, thereby always maintaining the illuminating light at a constant amount.

In such case, the microcomputer 108 shown in FIG. 4 controls the halogen lamp lighting circuit 106 thereby gradually attenuating the light amount thereof, based on the data for correcting the light amount increase of the metal halide lamp 1a.

More specifically, the electric power loss can be reduced if a chopper control is executed in the halogen lamp lighting circuit 106.

The control of the halogen lamp lighting circuit 106 by the microcomputer 108 may also be achieved by parallel control with a digital signal, serial control with a digital signal, or by an analog voltage control by providing the microcomputer 108 with a D/A converter and a port for pulse width modulation (PWM) output. In such case the halogen lamp lighting circuit 106 controls the output voltage by converting the control data from the microcomputer 108 for example into a pulse width thereby controlling the chopper time.

Figure 9:
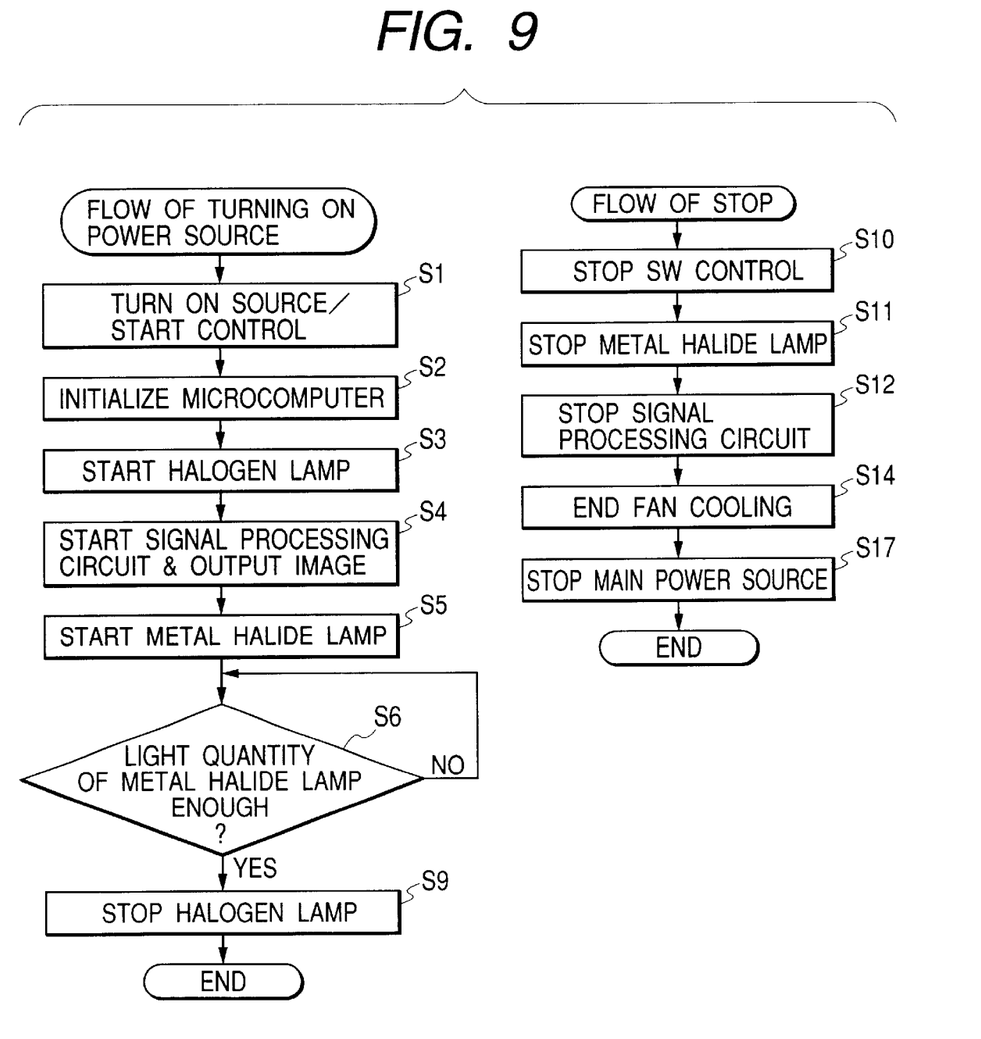
FIGS. 9 and 10 are flow charts showing the function of a projection apparatus in second and third embodiments of the present invention.

Referring to FIG. 9, a process of terminating the function of the apparatus is executed by a stop switch control (step S10), stopping of the metal halide lamp 1a (step S11), stopping of the signal processing circuit 104 (step S12), termination of fan cooling (step S14) and stopping of the main lower supply (step S17).

Third Embodiment

In the foregoing second embodiment, the light amount can be further stabilized by providing a light amount sensor in the optical path as shown in FIG. 8, and causing the microcomputer to so control the halogen lamp lighting circuit as to obtain a constant light amount.

Figure 10:
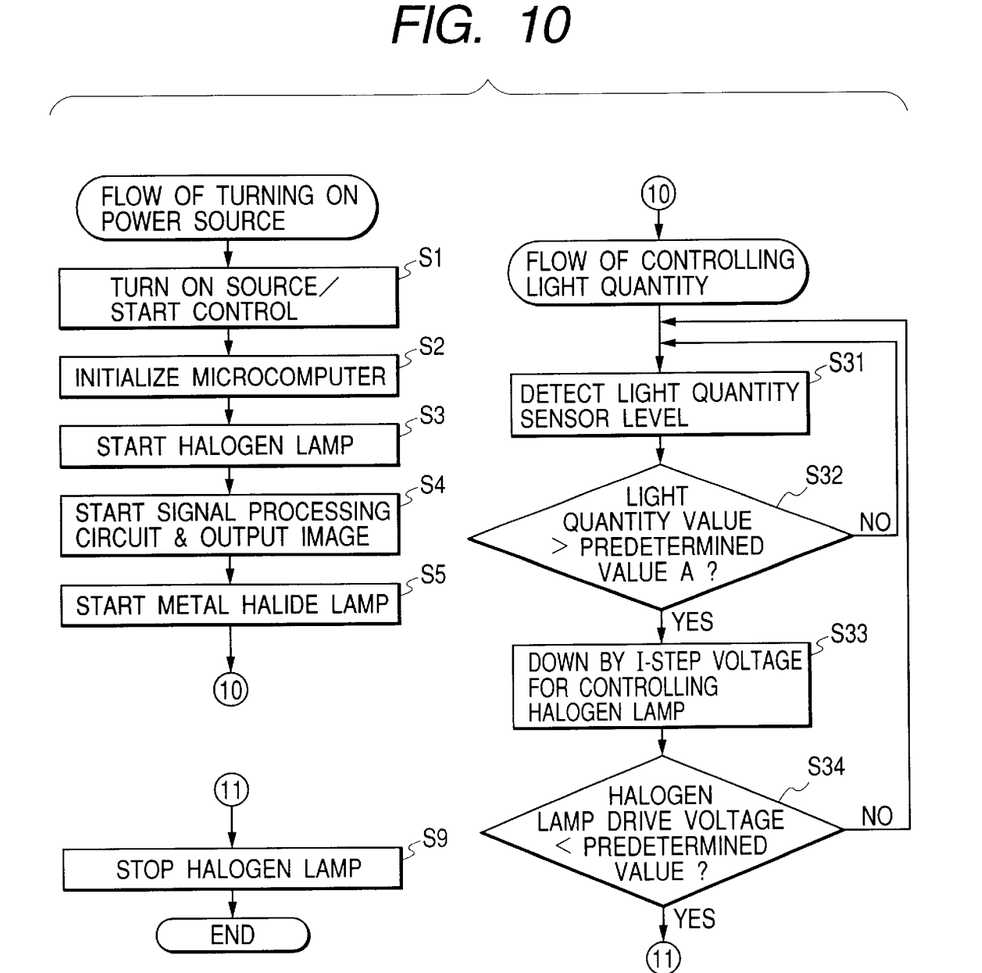

A light amount sensor 200 is provided in a position close to the lower edge of the image area of the liquid crystal panel 16 shown in FIG. 8, and a signal obtained therein is subjected to suitable signal processing such as integration for accommodating external perturbations such as noises and fed back to the microcomputer 108 for digitization by an A/D converter provided therein, whereby the aforementioned halogen lamp lighting circuit 106 is controlled by a sequence for example shown in FIG. 10.

In FIG. 10, the steps S1 to S5 at the turning-on of the power supply are same as those shown in FIG. 9. Thereafter a step S31 detects the level detection by the light amount sensor, and a step S32 discriminates whether the light amount is larger than a predetermined value A, and, if larger, a step S33 decreases the halogen lamp control voltage by a step. Also if a step S34 discriminates that the halogen lamp drive voltage is smaller than a predetermined voltage B. a step S9 turns off the halogen lamp whereupon the operation is terminated.

In such configuration, the light amount sensor can be practically composed of a phototransistor, a photodiode, a solar cell or a CdS sensor.

Also in such configuration, the light amount of the halogen lamp can be regulated by the voltage, but, since the halogen lamp may be deteriorated at about 50% or lower of the rated voltage, it is necessary to turn off the halogen lamp 2a at an even lower driving voltage.

It is also necessary to pay attention to the light regulating range, even for the light source with faster start-up characteristics.

Also in the foregoing first embodiment, instead of switching the lamps based on the lighting time from the start of lighting of the metal halide lamp, measured by the microcomputer or the like, it is possible to further improve the precision by switching the lamps upon detection of the predetermined light intensity by a similar light amount sensor. The light amount sensor in such configuration is not illustrated but is preferably provided in a part of the optical path of the metal halide lamp.

Fourth Embodiment

In the foregoing first to third embodiments in which the metal halide lamp 1a constituting the first light source and the halogen lamp 2a constituting the second light source are switched, the halogen lamp 2a generally has a lower color temperature in comparison with the metal halide lamp 1a.

Consequently, in a projection apparatus of the present embodiment, a trimming filter is inserted between the halogen lamp 2 and the optical path switching means in order to improve the color temperature, thereby suppressing the fluctuation in the color temperature.

Fifth Embodiment

In addition to the optical improvement in the color temperature explained above, there is provided means for varying the balance of the levels, setups (brightness levels) and gamma corrections of the three color signals of red, blue and green in the signal processing circuits in linkage with the switching control of the light sources, thereby suppressing the fluctuation in the color temperature.

It is rendered possible to avoid the extreme fluctuation in the color temperature at the switching of the light source, by causing the signal processing circuit 104 shown in FIG. 4 to control the balance of the levels, setups (brightness levels) and gamma corrections of the three color signals of red, blue and green in linkage with the switching control of the light sources.

The projection apparatus of the foregoing embodiments, employing the light sources of two kinds, can project an image of practical brightness even immediately after the turning-on of the power supply, and provide a projection image of high efficiency and high color presentation in stepwise manner with the start-up of the light sources. Also the image projection state can be immediately restored in case of an instantaneous interruption of the power supply.

As explained in the foregoing, the inventions of the present application can provide an advantageous projection apparatus utilizing plural light sources.

What is claimed is:

1. A projection apparatus provided with a light valve and capable of modulating light by two-dimensionally arranged plural pixels of said light valve and projecting thus modulated light, the apparatus comprising:

a first light source;

a second light source;

a mirror for guiding the light from said first light source or the light from said second light source to said light valve; and a movable mechanism for varying the relative position between said mirror and said first and second light sources.

2. A projection apparatus provided with a light valve and capable of modulating light by two-dimensionally arranged plural pixels of said light valve and projecting thus modulated light, the apparatus comprising:

a first light source;

a second light source; and a mirror for guiding the light from said first light source or the light from said second light source to said light valve;

wherein the position of said mirror is changed to select whether said light valve is irradiated with the light from said first light source or with the light from said second light source.

3. A projection apparatus provided with a light valve and capable of modulating light by two-dimensionally arranged plural pixels of said light valve and projecting thus modulated light, the apparatus comprising:

a first light source;

a second light source; and a mirror for guiding the light from said first light source or the light from said second light source to said light valve;

wherein the position of at least either of said first and second light sources relative to said mirror is changed to select whether said light valve is irradiated with the light from said first light source or with the light from said second light source.

4. A projection apparatus provided with a light valve and capable of modulating light by two-dimensionally arranged plural pixels of said light valve and projecting thus modulated light, the apparatus comprising:

a first light source;

a second light source;

a reflector for condensing the light from said first light source and the light from said second light source;

wherein said first and second light sources are provided in the vicinity of the focal point of said reflector.

5. A projection apparatus according to claim 4, further comprising light regulation means for regulating the light amount with which said first light source irradiates said light valve.

6. A projection apparatus according to claim 4, wherein the light amount with which said first light source irradiates said light valve is gradually decreased in a period from the turning-on of the power supply to said second light source to a stable lighting state of said second light source.

7. A projection apparatus according to claim 4, further comprising a control unit for executing control in such a manner that the sum o f the light amount of said first light source irradiating said light valve and that of said second light source irradiating said light valve approaches a constant value.

8. A projection apparatus according to claim 5, wherein said light amount regulation is executed according to correction data based on the change of the light amount of said second light source as a function of time from the start of lighting of said second light source.

9. A projection apparatus according to claim 5, wherein said light amount regulation is executed based on the result of detection of the amount of the light irradiating said light valve.

10. A projection apparatus according to any of claims 1 to 4, wherein said first light source has a period from the turning-on of the power supply to the stable lighting state, shorter than that of said second light source.

11. A projection apparatus according to any of claims 1 to 4, further comprising a timer for controlling the irradiation of said light valve by the light from said first light source.

12. A projection apparatus according to any of claims 1 to 4, further comprising a light amount sensor for controlling the irradiation of said light valve by the light from said first light source.

13. A projection apparatus according to any of claims 1 to 4, further comprising a sensor for detecting the output light amount of said second light source.

14. A projection apparatus according to any of claims 1 to 4, further comprising stopping means for stopping the light emission of said second light source for a predetermined period.

15. A projection apparatus according to any of claims 1 to 4, wherein said first light source is composed of a xenon lamp, a halogen lamp, a tungsten filament lamp, a fluorescent lamp, a light emitting diode, or an electron source-type light source.

16. A projection apparatus according to any of claims 1 to 4, wherein said second light source is composed of a metal halide lamp or a mercury-sealed discharge lamp.

17. A projection apparatus according to any of claims 1 to 4, further comprising an optical filter for filtering the light irradiating said light valve, to be used in either of a period in which said light valve is principally irradiated with said first light source and a period in which said light valve is principally irradiated with said second light source.

18. A projection apparatus according to any of claims 1 to 4, further comprising a circuit for varying the operation on an image signal for driving said light valve in a period in which said light valve is principally irradiated with said first light source and a period in which said light valve is principally irradiated with said second light source.

* * * * *

UNITED STATES PATENT AND TRADEMARK OFFICE
CERTIFICATE OF CORRECTION

PATENT NO.    : 6,543,900 B2
DATED         : April 8, 2003
INVENTOR(S)   : Minoru Noji et al.

It is certified that error appears in the above-identified patent and that said Letters Patent is hereby corrected as shown below:

Column 1,
Line 51, "la" should read -- 1a --.

Column 7,
Line 4, "colling" should read -- cooling --.

Column 9,
Line 30, "8 step" should read -- (step --.
Line 67, "la" should read -- 1a --.

Column 10,
Line 59, "id" should read -- 1d --.

Column 12,
Line 16, "B." should read -- B, --.

Column 14,
Line 12, "o f" should read -- of --.

Signed and Sealed this

Eighteenth Day of November, 2003

JAMES E. ROGAN
*Director of the United States Patent and Trademark Office*